United States Patent

Ohkoda et al.

[11] Patent Number: 5,181,715
[45] Date of Patent: Jan. 26, 1993

[54] SHEET CONVEYING UNIT AND SYSTEM USING THE SAME

[75] Inventors: Keiji Ohkoda; Tomohiro Kudo; Satoshi Shimizu, all of Yokohama; Keiichi Kawasaki, Tokyo, all of Japan

[73] Assignee: Canon Kabushiki Kaisha, Tokyo, Japan

[21] Appl. No.: 873,899

[22] Filed: Apr. 24, 1992

Related U.S. Application Data

[63] Continuation of Ser. No. 618,510, Nov. 27, 1990, abandoned.

[30] Foreign Application Priority Data

Dec. 15, 1989 [JP] Japan ............................ 1-325007

[51] Int. Cl.$^5$ .............................................. B65H 5/06
[52] U.S. Cl. .................................... 271/272; 271/273
[58] Field of Search ................ 271/3, 6, 7, 12, 264, 271/272, 273, 274, 198, 314

[56] References Cited

U.S. PATENT DOCUMENTS 3,945,636  3/1976  Kockler et al. .................. 271/274
4,420,151 12/1983  Kobayashi ..................... 271/274 X

FOREIGN PATENT DOCUMENTS

| 2745291 | 4/1978 | Fed. Rep. of Germany . | |
| 54-102761 | 8/1979 | Japan | 271/274 |
| 62-244837 | 10/1987 | Japan | 271/272 |
| 63-212645 | 9/1988 | Japan . | |
| 63-258339 | 10/1988 | Japan . | |
| 223147 | 1/1990 | Japan | 271/272 |
| 1593363 | 7/1981 | United Kingdom . | |

Primary Examiner—David H. Bollinger
Attorney, Agent, or Firm—Fitzpatrick, Cella, Harper & Scinto

[57] ABSTRACT

The sheet conveying unit of the present invention has a roller for conveying a sheet which contacts therewith, a supporting portion for rotatably supporting both sides of the roller, a drive motor for rotatively driving the roller, and a frame portion for holding the supporting portion and the drive motor and making them integral with each other. The rotary shaft of the roller and the rotary shaft of the drive motor are a common shaft. The rotor of the drive motor is mounted on the common shaft, and the stator of the drive motor is mounted on the frame portion.

16 Claims, 6 Drawing Sheets

SHEET CONVEYING UNIT AND SYSTEM USING THE SAME

This application is a continuation of application Ser. No. 07/618,510 filed Nov. 27, 1990, now abandoned.

BACKGROUND OF THE INVENTION

1. Field of the Invention

This invention relates to a sheet conveying unit used to accurately convey a sheet such as photosensitive film for example, in an image recording apparatus, an image reading apparatus or the like.

2. Description of the Prior Art

FIG. 5 of the accompanying drawings shows an example of the sub-scanning conveying mechanism of an apparatus described in Japanese Laid-Open Patent Application No. 63-212645 which reads an accumulative fluorescent material sheet on which radiation images are accumulatively recorded.

In FIG. 5, the reference numeral 101 designates an accumulative fluorescent material sheet which is conveyed rightwardly as viewed in the figure, whereby sub-scanning is effected and at the same time, a light beam 113 scans perpendicularly to the plane of the drawing sheet, whereby main scanning is effected and the reading of images is done by exciting light. The sheet 101 is nipped between two pairs of sub-scanning rollers 102, 103 and 104, 105. The reference numeral 108 denotes a motor, the power of which is transmitted to the sub-scanning roller 102 by a belt passed over a pulley 109 coupled to the output shaft of the motor and a pulley, not shown, mounted on the shaft of the sub-scanning roller 102. Pulleys 106 and 107 are also coupled to the shafts of the sub-scanning rollers 102 and 104 and are connected together by a belt 114. The sheet between the two pairs of sub-scanning rollers is supported by guide plates 111 and 112. With the construction as described above, the motor is rotated clockwise, whereby the clockwise rotational force of the motor is transmitted to the sub-scanning rollers 102 and 104 and the sheet 101 can be conveyed rightwardly as viewed in the figure.

FIG. 6 of the accompanying drawings shows a sub-scanning conveying mechanism resembling the above-described example of the prior art which is described in Japanese Laid-Open Patent Application No. 63-258339. FIG. 6 corresponds to a view in which the example of the prior art shown in FIG. 5 is seen from above, and in FIG. 6, reference numerals identical to those in FIG. 5 designate identical or equivalent members.

The difference of the example shown in FIG. 6 from the example shown in FIG. 5 is that the driving power of the motor 108 is transmitted not by the use of the belt 110, but by the use of a connecting member 120. In FIG. 6, the reference numeral 121 designates bearings, and the reference numerals 122 and 123 denote frames.

However, these examples of the prior art have suffered from the problem that the constant speed of the rotational speed of the sub-scanning rollers is deteriorated relative to the constant rotational speed of the drive source.

In optical image reading or recording apparatuses of high accuracy like the above-described examples of the prior art, a constant speed of the conveyance speed in the sub-scanning direction of a sheet is very important. Particularly in a recording apparatus for medical treatment, the pitch irregularity of scanning lines caused by the disturbance of the conveyance speed leads to the density irregularity of images, and in the worst case, may lead to a wrong diagnosis. Consequently, it is necessary that the wow flutter of the conveyance speed of the sheet be held down to the order of 2% or less.

If the conveyance speed of the sheet is 40–50 mm/sec. and the diameter of the sub-scanning roller 102 is 20–40 mm and the reduction ratio of the sub-scanning rollers and the motor 108 is 1:1, the number of revolutions of the motor is 20–50 rpm. It is very difficult to hold down the wow flutter to 0.2% or less as previously described in such a low rotation range, and there is required a motor controlling technique of very high accuracy.

Also, the sheet conveyed is often of a large size such as size B4 or a half size (43 cm×35 cm), for example, in the case of the use for medical treatment, and this makes it even more difficult to obtain a constant conveyance speed.

It is reported in the aforementioned Japanese Laid-Open Patent Application No. 63-212645 that where power is transmitted by the use of a belt as in FIG. 5, the power spectrum of the driving shaft and the follower shaft is such as shown in FIG. 7 of the accompanying drawings. That is, it is seen that even in the best case, the follower shaft has less speed consistency than the driving shaft.

Also, where a connecting member is used as shown in FIG. 6, the speed consistency of the rollers may be less than that of the motor. For example, where a popular metallic flexible coupling is used as the connecting member, the resonance frequency of the sub-scanning rollers is determined by the inertial mass of the sub-scanning rollers and the torsion spring constant of the flexible coupling. The wow flutter of the rollers in the vicinity of this resonance frequency is remarkably aggravated. Moreover, it has been found that unless a great inertial mass such as a fly-wheel is added to the sub-scanning rollers, there is a possibility of said resonance frequency being in an area which may cause harmful scanning line pitch irregularity.

As noted above, the above-described examples of the prior art suffer from the possibility of conveying the sheet at an inconsistent speed.

Also, speed consistency can be measured only after the apparatus has been assembled and therefore, quality control is difficult. Further, the interchange of the rollers and motor is not easy and it is difficult to say that the speed consistency is reproduced after the interchange.

SUMMARY OF THE INVENTION

It is the object of the present invention to provide a sheet conveying unit which can obtain very accurate speed of conveyance, and a system on which such unit is removably mountable to thereby make maintenance easy.

DESCRIPTION OF THE PREFERRED EMBODIMENTS

An embodiment of the present invention will hereinafter be described in detail with reference to FIGS. 1 to 3.

Figure 1:
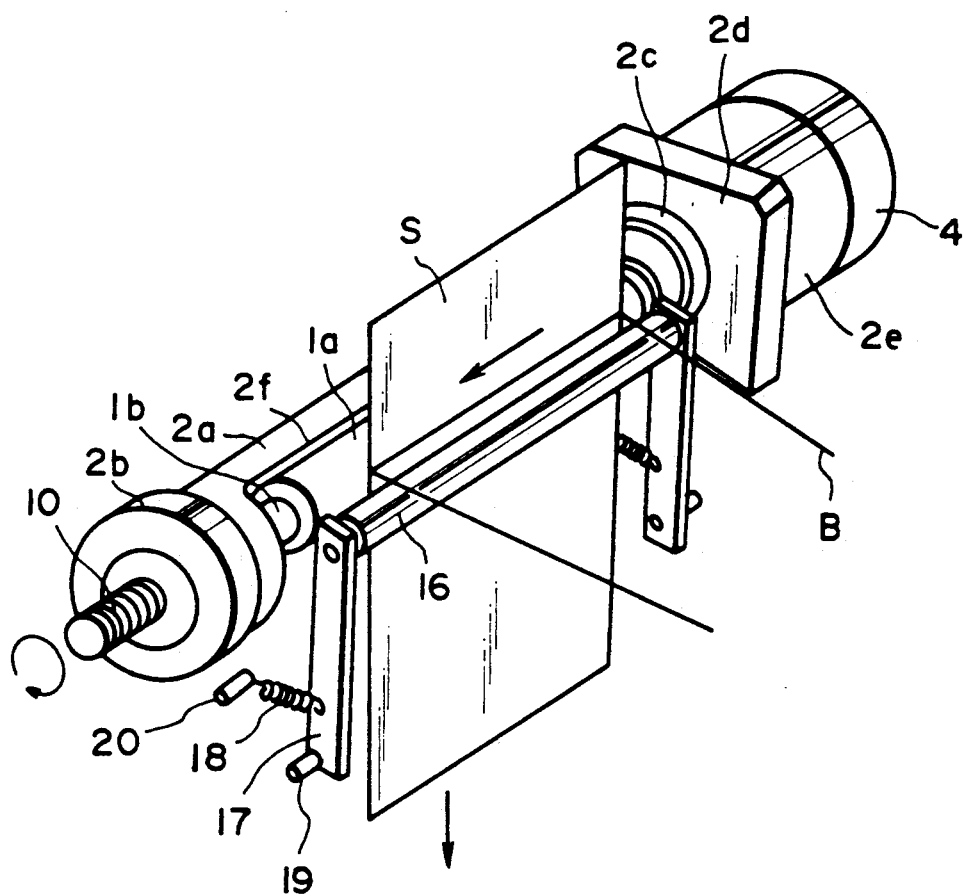
FIG. 1 is a perspective view of a first embodiment of the present invention.
Figure 2:
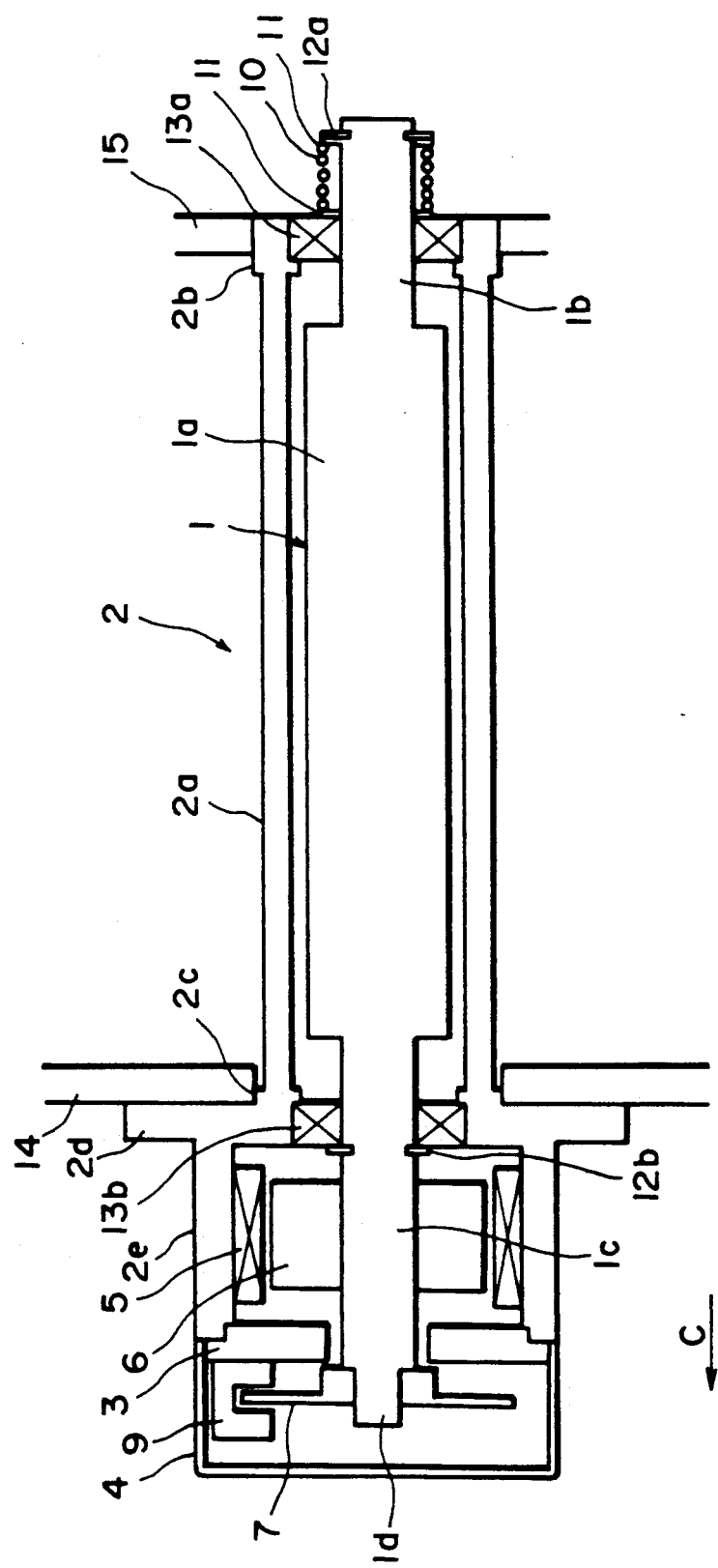
FIG. 2 is a cross-sectional view of the first embodiment.

FIG. 1 is a perspective view of an embodiment of a sheet conveying unit according to the present invention, and FIG. 2 is a cross-sectional view thereof. FIG. 3 shows the construction of an image recording apparatus for medical treatment which incorporates the sheet conveying unit of FIG. 1 as a sub-scanning conveying mechanism.

The image recording apparatus of this kind is such that a laser beam is scanned on a recording sheet conveyed in the sub-scanning direction to thereby record images, and the size of the recording sheet S used which is, for example, photosensitive film, is generally about 35×43 cm, about 35×35 cm or about 28×35 cm. In FIG. 3, the reference numeral 21 designates the body of the image recording apparatus, and in a supply magazine 22 loaded substantially horizontally therein, there are piled and contained a number of unused recording sheets S of the same size. As is well known, the supply magazine 22, when loaded into the apparatus body 21, has its lid closed, and when the light interception in the apparatus body 21 is secured after the loading, the supply magazine has its lid opened by a lid opening-closing mechanism, not shown, so that the uppermost one of the sheets S therein can be taken out by a suction device 23. The leading end of the sheet S suctioned by the suction device 23 is inserted between a belt 25 passed over three rollers 24 and a conveying roller 26, whereafter the suction force of the suction device 23 is released and therefore, the sheet S is conveyed downwardly by the driving force of the conveying roller 26. A one-way clutch is installed between the conveying roller 26 and a drive source therefor so that even when the drive source is stopped, the sheet S can be easily inserted leftwardly as viewed in FIG. 3 between the conveying roller 26 and the belt 25.

The sheet S, which has changed its direction to the sub-scanning direction, i.e., the vertical direction, while being nipped between the conveying roller 26 and the belt 25, is further conveyed by a first pair of conveying rollers 27 and a pair of sub-scanning rollers 1a and 1b which are a second pair of conveying rollers, whereafter it is received into a receiving magazine 29 from gravity. Immediately before it arrives at the pair of sub-scanning rollers 1a and 1b main scanning is effected by a laser beam B from an optical unit 30. The reference numeral 2 denotes a sheet conveying unit comprising the sub-scanning rollers 1a, 1b and a drive motor, not shown, made into a unit, and this sheet conveying unit 2 is removably mountable with respect to the apparatus. A guide plate 31 for regulating the position of the sheet S is provided between the conveying roller 26 and a pair of conveying rollers 27 and a similar guide plate 32 is also disposed between the pair of conveying rollers 27 and the pair of sub-scanning rollers 1a, 1b so that the laser beam B may be applied through the slight clearance between the lower end of the guide plate 32 and the pair of sub-scanning rollers 1a, 1b. The inner surface of the guide plates 31 and 32 are smoothly finished to make the friction thereof with the sheet S as small as possible. The first pair of conveying rollers 27 are retractably supported in the sheet conveyance path by a retracting mechanism, not shown. FIG. 3 shows the first pair of conveying rollers 27 as being in the sheet conveyance path, but in a position wherein they are retracted from the sheet conveyance path, they do not contact with the sheet S.

Figure 3:
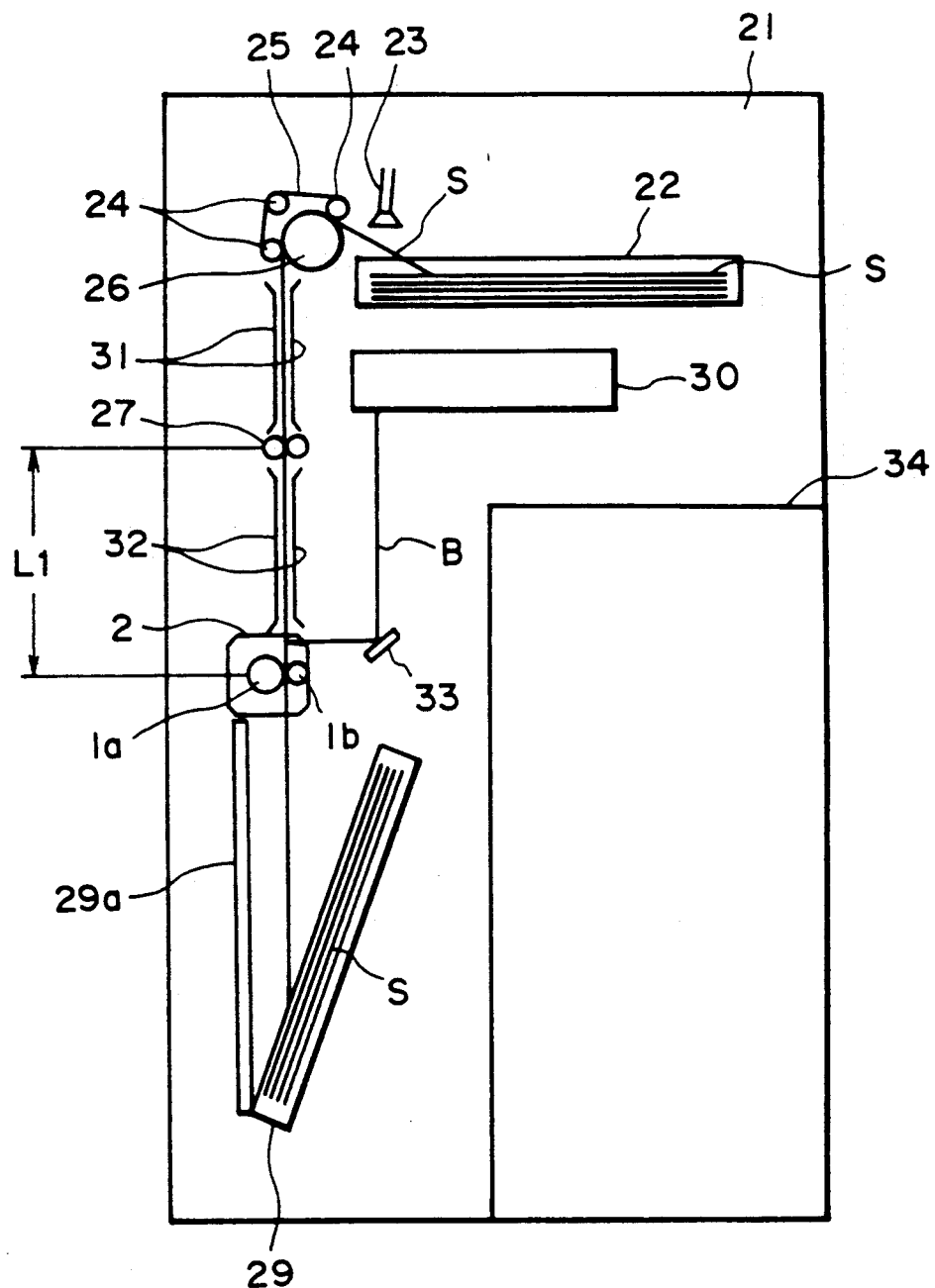
FIG. 3 shows the construction of a recording apparatus having the mechanism of the present invention.

In the state in which the pair of conveying rollers 27 are in the sheet conveyance path as shown in FIG. 3, the distance L1 in the conveyance path between the pair of conveying rollers 27 and the pair of sub-scanning rollers 1a, 1b is smaller than the length of a sheet S whose length in the conveyance direction is shortest among sheets S of various sizes used. Thus, even when use is made of the sheet S whose length in the conveyance direction is shortest, the leading end of the sheet S is nipped between the pair of sub-scanning rollers 1a and 1b before the trailing end of the sheet S leaves the pair of conveying rollers 27. Immediately after the leading end of the sheet S is nipped between the pair of sub-scanning rollers 1a and 1b, the first pair of conveying rollers 27 are retracted from the sheet conveyance path by the retracting mechanism, and after the retraction, recording is started.

The recording optical unit 30 contains therein a laser source, means for modulating the laser beam in conformity with a recording signal, a polygonal mirror for scanning the laser beam, etc. The laser beam emitted is reflected by a reflecting mirror 33 and main-scans the sheet S being conveyed in the sub-scanning direction, whereby an image is recorded on the sheet S. The sheet S on which recording has been effected falls due to gravity into the receiving magazine 29 after it leaves the pair of sub-scanning rollers 1a and 1b. The receiving magazine 29 is installed while being inclined at about 20° with respect to the vertical, and the lid 29a thereof adapted to be opened or closed with the lower end thereof as a fulcrum is opened substantially vertically. This receiving magazine 29 also, when mounted in the apparatus body 21, is set in a state in which the lid 29a is opened by a lid opening-closing mechanism, not shown, and when it is to be taken out, it is drawn outwardly after the lid is closed by the same lid opening-closing mechanism so that the recorded sheet S contained therein may not be sensitized. In FIG. 1, the reference numeral 34 designates a control unit including a control circuit for effecting the control of the entire apparatus, a power source, etc.

The sheet conveying unit will now be described in greater detail with reference to FIGS. 1 and 2.

In these figures, the reference numeral 1 denotes a sub-scanning roller having a roller portion 1a and shaft portions 1b, 1c and 1d. The roller portion 1a is in contact with the sheet, and the shaft portion 1b is supported by a bearing 13a. The shaft portion 1c is supported by a bearing 13b and has the rotor 6 of a motor mounted thereon. Further, the rotor 7 of a popular optical type encoder is coupled to the shaft portion 1d. The shaft portions 1b and c have grooves for restraining E-type snap rings 12a and 12b, and a pre-pressure spring 10 and a washer 11 are forced in between the bearing 13a and the snap ring 12a so as to apply moderate pre-pressure in the axial direction of the sub-scanning roller 1. The reference numeral 2 designates a frame comprising a connecting portion 2a for holding the bearings 13a and 13b, portions 2b and 2c fitted to the fitting portions of the frames 14 and 15 of the recording apparatus body, a flange portion 2d to be fixed to the frame 14, a housing portion 2e for holding the stator 5 of the motor, and an opening 2f formed in the connecting portion 2a. The reference numeral 3 denotes a pedestal coupled to the housing portion 2e for fixing the detecting portion 9 and cover 4 of the encoder.

In FIG. 1, there is also shown a follower roller 16 mounted to the recording apparatus body through a shaft 19 and a lever 17. A tension spring 18 is hooked between the lever 17 and a shaft 20 mounted on the body and urges the follower roller 16 against the sub-scanning roller 1a with a moderate pressure force.

While the sheet S conveyed from above in FIG. 1 is nipped between the pair of sub-scanning rollers 1a and 1b and then is sub-scanned downwardly, main scanning by the laser beam B is effected and an image is recorded as a latent image on the sheet S.

Making the rollers, the motor and the sub-scanning conveying mechanism including the encoder portion into a unit as described above has such effects as will be described below.

(1) Elements such as a belt and a flexible coupling which deteriorate the stability of speed are absent between the sub-scanning roller 1a for conveying the sheet and the drive source, and the characteristic of the drive source is directly transmitted to the roller Therefore, very stable sheet conveyance becomes possible and images of high quality are obtained.

(2) The condition of the isolated unit and the condition when the unit is mounted in the apparatus are substantially the same and therefore, the optimum designing of the control characteristic of the motor becomes easy and it is possible to decrease the wow flutter in a particular frequency band in accordance with visual characteristic and improve the quality of images.

(3) The performance of the motor unit as it is incorporated in the apparatus can be determined from evaluating of the performance of the motor unit before it is mounted in the apparatus and therefore, the quality control in manufacture becomes easy.

(4) When the motor unit is to be removed from the apparatus body, the entire unit can be pulled out in the direction of arrow C in FIG. 2 simply by removing a bolt, not shown, and the mounting and dismounting of the motor unit with respect to the apparatus body is easy and the serviceability during assembly or after installation is improved. Moreover, the performance can be compensated for by the individual motor unit and therefore, even when trouble occurs, the performance of the apparatus when shipped can be reproduced simply by interchanging the motor unit at the place where the apparatus is installed.

(5) Any member such as a belt which will change with time is absent in the driving system and the initial performance can be maintained for a long period of time.

Second Embodiment

Figure 4:
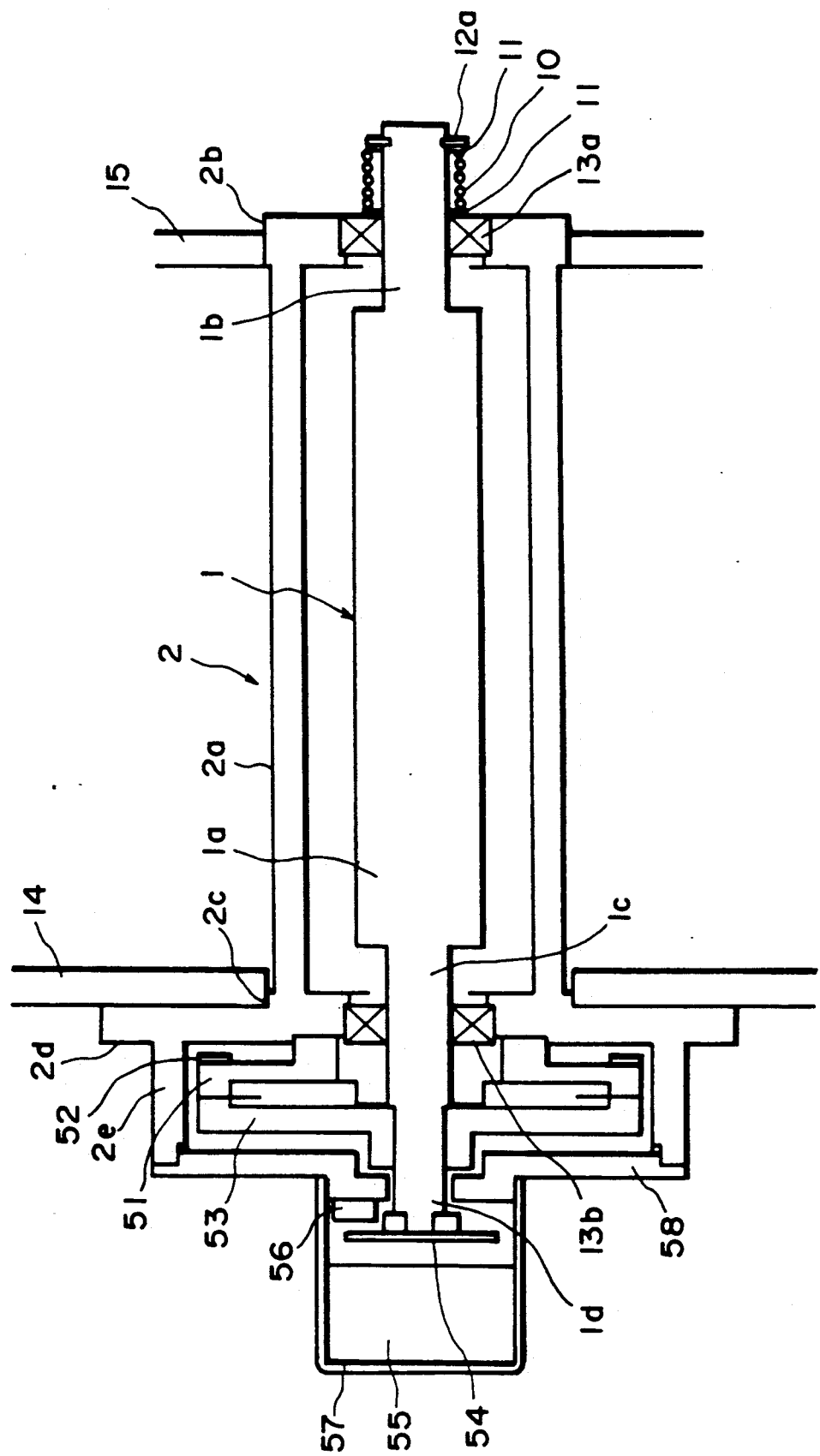
FIG. 4 is a cross-sectional view of a second embodiment of the present invention.
Figure 5:
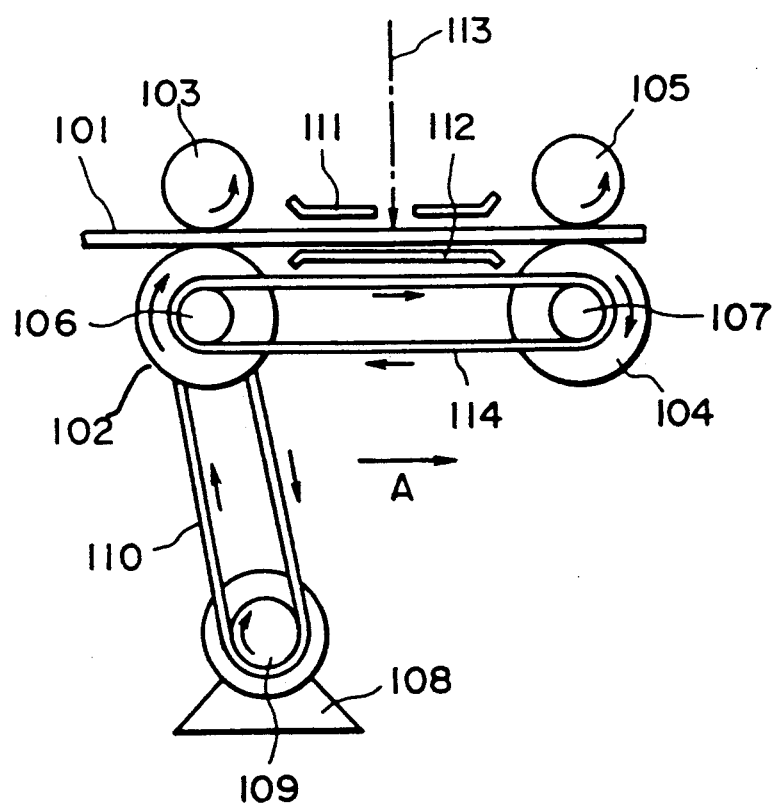
FIG. 5 and 6 show the constructions of examples of the prior art.
Figure 6:
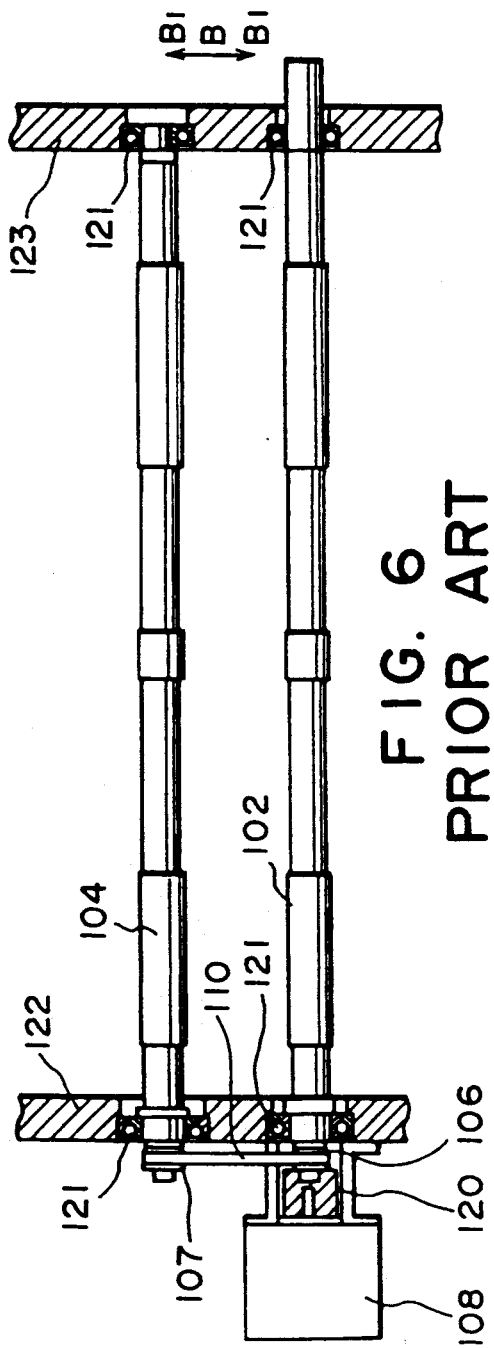
Figure 7:
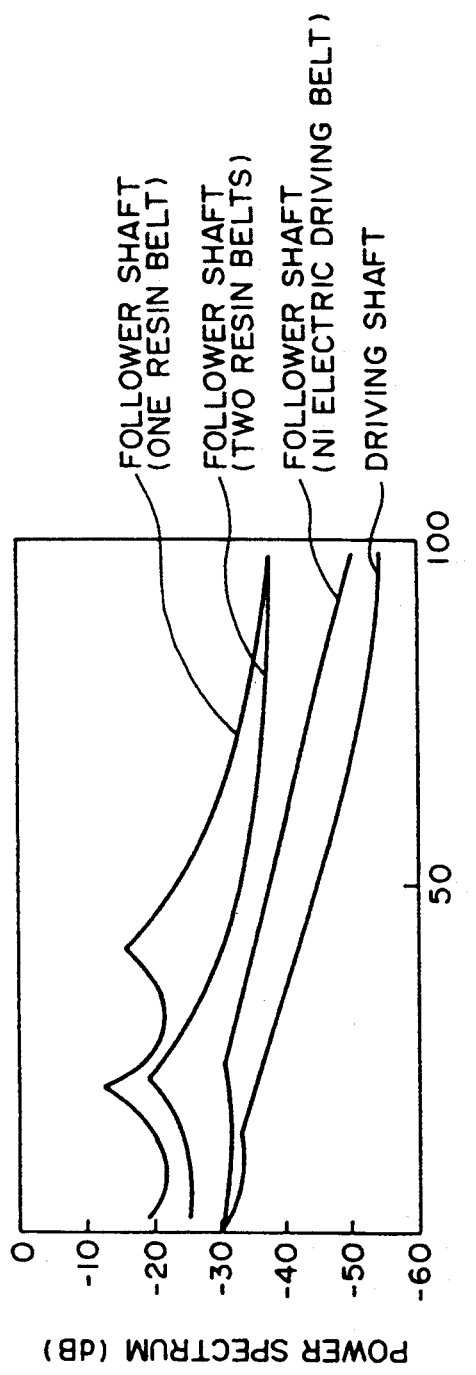
FIG. 7 is a power spectrum graph of the driving shaft and follower shaft in the examples of the prior art.

A second embodiment of the present invention is shown in FIG. 4, wherein reference characters identical to those in FIG. 2 designate identical or similar members. The differences of this embodiment from the embodiment of FIG. 2 are that an ultrasonic motor is used as the drive source and that a laser rotary encoder is incorporated in the encoder unit.

In FIG. 4, the reference numeral 51 designates a stator made of a resilient material such as stainless steel and fixed to the frame 2. An electrostrictive element 52 is mounted on one side of the stator 51. Accordingly, a travelling wave which travels with time is generated in that portion of the stator 51 which is in contact with a rotor 53. The rotor 53 is fixed to the sub-scanning roller 1. The left end portion of FIG. 4 is a laser rotary encoder unit comprised of a disk-like diffraction grating 54, an optical system 55 including a semiconductor laser, a photodiode, a prism, a reflecting optical system 56, a cover 57, a pedestal 58, etc.

Again where an ultrasonic motor is used as the drive source, effects similar to those of the previous embodiment are found and there are further advantages. The ultrasonic motor is compact and light in weight, is very high in speed stability even during its low-speed revolution and moreover produces a high torque. Accordingly, the stability of the sheet conveyance speed becomes good, becomes strong against the fluctuation of conveyance resistance and thus good recording and reading becomes possible. Also, the laser rotary encoder is compact and light in weight and is small in the inertia of the rotary portion thereof, and moreover can generate pulses of as high resolving power as 80,000 pulses per one full rotation. Consequently, control of higher accuracy becomes possible and such encoder is suitable for an ultrasonic motor of good control responsiveness.

While two embodiments of the apparatus according to the present invention have hitherto been described, the present invention is not restricted to the above-described embodiments, but various modifications thereof are conceivable.

For example, the encoder unit need not always use the same shaft as that of the roller unit or the motor unit. The encoder unit may be coupled to the motor unit or the roller unit by a popular flexible coupling or the like, because the encoder unit is small in inertial mass as compared with the motor and the roller and the torsional force applied to the coupling means between the encoder unit and the motor unit or the roller unit is very small as compared with the torsional force produced between the motor unit and the roller unit.

The location of the encoder need not always be at the end of the motor unit, but if within a range in which the torsion of the shaft is allowable, the motor unit and the encoder unit may be separately disposed at the opposite ends of the roller unit.

Although in FIG. 1, the follower roller 16 is shown as being fixed to the body side, it may be fixed to the frame 2 on the motor unit side. By doing so, the difference between the performance characteristic of the isolated motor unit and the performance characteristic of the motor unit as it is mounted in the apparatus is further reduced. Consequently, quality control is improved.

Also, in the apparatus of the construction as shown in FIG. 3, a torque in the accelerating direction is applied to the sub-scanning rollers conveying the sheet, by the gravity of the sheet. Accordingly, if the motor is simply controlled so as to accelerate only when the speed of the rotary portion slows down, the rollers may sometimes be rotated by the gravity of the sheet at a speed higher than a set speed. So, it is necessary to effect control also in the decelerating direction or to contain a brake that will negate the torque provided by the gravity of the sheet. That brake may be included in the motor unit.

Also, in FIG. 1, for the sake of convenience, each of the roller 1 and the frame 2 is constructed of a single member, but if there is no problem in accuracy and strength, each of them may be divided into several portions, which may be assembled together.

Further, in both FIGS. 2 and 4, the bearing is disposed inside the roller and the motor and encoder are disposed outside thereof, but alternatively, one or both of the motor and the encoder unit may be provided inside the bearing.

While an example of the image recording apparatus has been shown in FIG. 3, the present invention can of course be equally applied to image scanning apparatuses at large, for example, an image reading apparatus for reading images by light scanning as shown in the description of the prior art.

We claim:

1. A sheet conveying unit to be detachably mounted to an apparatus for recording images on a sheet and/or for reading images from a sheet, comprising:
    a rotary shaft,
    a roller mounted on said rotary shaft for conveying the sheet coming into contact therewith;
    a drive motor, including a rotor and a stator, for rotatively driving said rotary shaft, with said rotor being mounted on one end of said rotary shaft; and
    a bearing for rotatably supporting the other end of said rotary shaft.

2. A sheet conveying unit according to claim 1, further comprising detecting means for detecting the rotating state of said rotary shaft.

3. A sheet conveying unit according to claim 2, wherein said detecting means includes a rotor mounted on said rotary shaft.

4. A sheet conveying unit according to claim 2, wherein said detecting means has a rotary encoder.

5. A sheet conveying unit according to claim 4, wherein said rotary encoder is a laser rotary encoder.

6. A sheet conveying unit according to claim 4, wherein said encoder is mounted on a distal end portion of said one side of said rotary shaft.

7. A sheet conveying unit according to claim 1, wherein said drive motor has an ultrasonic motor.

8. A sheet conveying unit according to claim 1, further comprising a removable frame for mounting said bearing and said drive motor.

9. An optical scanning system including a sheet conveying unit, comprising:
    a removably mountable sheet conveying unit for conveying a sheet;
    a light source; and
    a scanning mechanism for causing light from said light source to optically scan over the sheet conveyed by said sheet conveying unit, wherein
    said sheet conveying unit comprises:
    a rotary shaft;
    a roller mounted on said rotary shaft for conveying the sheet coming into contact therewith;
    a drive motor, including a motor and a stator, for rotatively driving said rotary shaft, with said rotor being mounted on one end of said rotary shaft; and
    a bearing for rotatably supporting the other end of said rotary shaft;
    the rotary shaft of said roller and the rotary shaft of said drive motor being a common shaft, the rotor of said drive motor being mounted on said common shaft, and the stator of said drive motor being mounted on said frame portion.

10. An optical scanning system according to claim 9, wherein said sheet conveying unit further has detecting means for detecting the rotating state of said rotary shaft.

11. A sheet conveying unit according to claim 10, wherein said detecting means includes a rotary encoder mounted on a distal end portion of said one side of said rotary shaft.

12. An optical scanning system according to claim 9, further comprising a removable frame for mounting said bearing and said drive motor.

13. An image recording system including a sheet conveying unit, comprising:
    a removably mountable sheet conveying unit for conveying a sheet;
    a light source;
    modulating means for modulating light from said light source in conformity with a recording signal; and
    a scanning mechanism for causing said modulated light to optically scan over the sheet conveyed by said sheet conveying unit to thereby form an image, wherein
    said sheet conveying unit comprises:
    a rotary shaft;
    a roller mounted on said rotary shaft for conveying the sheet coming into contact therewith;
    a drive motor, including a rotor and a stator, for rotatively driving said rotary shaft, with said rotor being mounted on one end of said rotary shaft; and
    a bearing for rotatably supporting the other end of said rotary shaft;
    the rotary shaft of said roller and the rotary shaft of said drive motor being a common shaft, the rotor of said drive motor being mounted on said common shaft, and the stator of said drive motor being mounted on said frame portion.

14. An image recording system according to claim 13, wherein said sheet conveying unit further has detecting means for detecting the rotating state of said rotary shaft.

15. A sheet conveying unit according to claim 14, wherein said detecting means includes a rotary encoder mounted on a distal end portion of said one side of said rotary shaft.

16. An image recording system according to claim 13, further comprising a removable frame for mounting said bearing and said drive motor.

* * * * *

UNITED STATES PATENT AND TRADEMARK OFFICE
CERTIFICATE OF CORRECTION

PATENT NO. : 5,181,715

DATED : January 26, 1993

INVENTOR(S) : Keiji Ohkoda, et al.

It is certified that error appears in the above-identified patent and that said Letters Patent is hereby corrected as shown below:

On the title page:

[56] REFERENCES CITED:

FOREIGN PATENT DOCUMENTS, "223147 1/1990 Japan" should read --2-23147 1/1990 Japan--.

COLUMN 4:

Line 60, "and c" should read --and 1c--.

COLUMN 5:

Line 26, "roller" should read --roller.--.

Signed and Sealed this

Eleventh Day of January, 1994

Attest:

BRUCE LEHMAN

Attesting Officer     Commissioner of Patents and Trademarks